(12) United States Patent
Lisso et al.

(10) Patent No.: US 11,008,167 B2
(45) Date of Patent: May 18, 2021

(54) ORDER PICKING SYSTEMS AND METHODS USING MOBILE ROBOTS

(71) Applicant: Target Brands, Inc., Minneapolis, MN (US)

(72) Inventors: Gregory Lisso, Minneapolis, MN (US); Gervasio Mutarelli, Minneapolis, MN (US)

(73) Assignee: Target Brands, Inc., Minneapolis, MN (US)

( * ) Notice: Subject to any disclaimer, the term of this patent is extended or adjusted under 35 U.S.C. 154(b) by 155 days.

(21) Appl. No.: 16/519,395

(22) Filed: Jul. 23, 2019

(65) Prior Publication Data

US 2020/0031578 A1 Jan. 30, 2020

Related U.S. Application Data

(60) Provisional application No. 62/711,676, filed on Jul. 30, 2018.

(51) Int. Cl.
*B65G 1/137* (2006.01)
*B65G 1/04* (2006.01)

(52) U.S. Cl.
CPC ......... *B65G 1/1375* (2013.01); *B65G 1/0492* (2013.01)

(58) Field of Classification Search
CPC combination set(s) only.
See application file for complete search history.

(56) References Cited

U.S. PATENT DOCUMENTS

| 7,904,191 | B2 | 3/2011 | Rossi et al. | |
|---|---|---|---|---|
| 8,965,562 | B1 * | 2/2015 | Wurman | G06Q 10/087 |
| | | | | 700/216 |
| 9,111,251 | B1 * | 8/2015 | Brazeau | G06Q 10/087 |
| 9,694,977 | B2 | 7/2017 | Aprea et al. | |
| 9,919,872 | B2 | 3/2018 | Khodl et al. | |
| 2010/0316468 | A1 * | 12/2010 | Lert | B65G 47/57 |
| | | | | 414/273 |
| 2015/0032252 | A1 * | 1/2015 | Galluzzo | B25J 9/162 |
| | | | | 700/218 |
| 2018/0104829 | A1 * | 4/2018 | Altman | H01M 50/20 |

* cited by examiner

*Primary Examiner* — Kyle O Logan
(74) *Attorney, Agent, or Firm* — Fish & Richardson P.C.

(57) ABSTRACT

Robotic automation and methods described herein can be used to enhance the efficiencies of order fulfillment and inventory stowage processes. For example, this document describes the use of mobile robots in conjunction with a human order picker to pick and transport items for order fulfillment processes in an efficient manner. The described systems and methods allow the elimination of human labor particularly related to transporting saleable goods and similar items. Mobile robots take over many of the tasks related to transporting the picked items. Accordingly, the efficiency of the human order picker, as measured by the number of line items picked per hour for example, is greatly enhanced.

20 Claims, 4 Drawing Sheets

ORDER PICKING SYSTEMS AND METHODS USING MOBILE ROBOTS

CROSS-REFERENCE TO RELATED APPLICATIONS

This application claims the benefit of U.S. Provisional Application Ser. No. 62/711,676, filed Jul. 30, 2018. The disclosure of the prior application is considered part of (and is incorporated by reference in) the disclosure of this application.

BACKGROUND

The ability to efficiently and accurately process customer orders has become an essential part of doing business. In many order-picking processes, items are stored in fixed locations on static shelving or pallet rack. A human order picker operates a forklift to pick one order at a time following a route up and down each aisle of a warehouse until the all the items on the entire order are picked. The order picker will usually use some type of picking cart into which the items are placed. The picking cart is then transported on the forklift by the human order picker to the next station (e.g., packaging, the shipping dock, sortation engine, etc.).

This basic order picking method can work relatively well in operations with a small total number of orders and a high number of items/picks per order. Operations with lower items/picks per order will find the travel time excessive in this type of picking, and operations with large numbers of orders will find that the congestion from many pickers working in the same areas slows down the processing.

In general, rack picking is one of the most labor intensive and expensive operations in many warehouse operations. Productivity gains in the form of reducing the travel time are greatly desirable.

SUMMARY

This document describes systems and methods for enhancing the efficiencies of order fulfillment and inventory stowage processes. For example, this document describes the use of mobile robots in conjunction with a human-operated order picker lift to pick and transport items for order fulfillment processes in an efficient manner.

In one aspect, this disclosure is directed to an order picking system. In some embodiments, the system includes: (i) an order picker configured to transport a cargo holder configured for receiving items picked from storage; (ii) a first mobile robot configured to transport the cargo holder; (iii) a second mobile robot configured to transport the cargo holder; and (iv) a warehouse fleet manager system in wireless communication with each of the order picker and the first and second mobile robots. In some embodiments, the warehouse fleet manager system is configured to: (a) control the first mobile robot to move in correspondence with movements of the order picker; (b) control the second mobile robot to move in correspondence with the movements of the order picker; (c) control the first mobile robot to move into a first cargo holder transfer position proximate to the order picker to receive a first cargo holder from the order picker; (d) control the first mobile robot to transport the first cargo holder received from the order picker to one or more remote locations; and (e) control the second mobile robot to move into a second cargo holder transfer position such that a second cargo holder can be transferred to the order picker.

Such an order picking system may optionally include one or more of the following features. The first and second cargo holders may each be cages. In some embodiments, the order picker lowers the first cargo holder onto a floor and then the first mobile robot moves under the first cargo holder to receive it. In particular embodiments, the order picker lowers the first cargo holder onto the first mobile robot and the first mobile robot receives it. The cargo holders may each be pallets. In some embodiments, the order picker lowers the first cargo holder onto the first mobile robot and the first mobile robot receives it. The first and second cargo holder transfer positions may be a same position. The first and second cargo holder transfer positions may be differing positions.

In another aspect, this disclosure is directed to a method of order picking. The method includes: (1) controlling a first mobile robot to move in correspondence with movements of an order picker that is transporting a first cargo holder configured for receiving items being picked from storage, the first mobile robot being configured to receive the cargo holder from the order picker; (2) controlling a second mobile robot to move in correspondence with the movements of the order picker, wherein the second mobile robot is transporting a second cargo holder; (3) controlling the first mobile robot to move into a cargo holder transfer position proximate to the order picker to receive the first cargo holder from the order picker; (4) controlling the first mobile robot to transport the first cargo holder received from the order picker to one or more remote locations; and (5) controlling the second mobile robot to move into the cargo holder transfer position such that the second cargo holder can be transferred to the order picker.

Such a method of order picking may optionally include one or more of the following features. Each of the controlling steps may be performed by a warehouse fleet manager system. The warehouse fleet manager system may be in wireless communication with each of the order picker and the first and second mobile robots. The first and second mobile robots may be controlled to shadow the movements of the order picker.

In another aspect, this disclosure is directed to a method of picking ordered items and stowing replenishment items. The method includes: a) transferring, by a worker operating an order picker, one or more first ordered items from first storage locations and putting the one or more first ordered items in or on a first cargo holder that is engaged with the order picker; b) transferring, from the order picker to a first mobile robot, the first cargo holder with the one or more first ordered items in or on it; c) after the transferring of the first cargo holder with the one or more first ordered items in or on it to the first mobile robot, transferring, from a second mobile robot, a second cargo holder with one or more replenishment items in or on it such that the second cargo holder with the one or more replenishment items in or on it becomes engaged with the order picker; d) transferring, by the worker operating the order picker, the one or more replenishment items from the second cargo holder that is engaged with the order picker into storage locations; and e) after the transferring of the one or more replenishment items into the storage locations, transferring, by the worker operating the order picker, one or more second ordered items from second storage locations and putting the one or more second ordered items in or on the second cargo holder that is engaged with the order picker. In some embodiments, the method also includes: f) transferring, from the order picker to the second mobile robot, the second cargo holder with the one or more second ordered items in or on it.

The systems and processes described here may be used to provide one or more of the following optional benefits. First, labor costs associated with order fulfillment processes overall may be reduced using the automated systems and processes described herein. For example, the systems and processes described herein can function largely autonomously or semi-autonomously, thereby reducing the need for human involvement in the process of transporting items that are picked from inventory and/or that need to be stowed into inventory. The lessened human involvement advantageously translates to lower operating costs. Second, the use of automation systems such as mobile robots as described herein can accelerate the speed of order fulfillment processes. Such reductions in cycle time for order fulfillment in some cases can facilitate quicker delivery of ordered items to customers, stores, and the like. Accordingly, customer satisfaction can be increased, and inventory-carrying costs can be decreased. Third, quality can be improved through automation so as to reducing potential human error. Robotic systems can be coded to deliver cargo to multiple granular downstream process points. Humans are statistically prone to a higher level of error than automation processes. Fourth, the density or number of order pickers per aisle can be increased. Most operations limit the number of order pickers to aisles because it is difficult or impossible in many cases for trucks to pass each other. A picker that has completed his task could therefore be blocked from dropping cargo by another picker in the same aisle that has not completed his/her task. Mobile robots with cargo, however, are much smaller and more precise in maneuvering, and could therefore pass pickers. This would allow for the operation of multiple order pickers per aisle, further improving cycle time.

Other features, aspects and potential advantages will be apparent from the accompanying description and figures.

DESCRIPTION OF DRAWINGS

Like reference symbols in the various drawings indicate like elements

DETAILED DESCRIPTION

Figure 1:
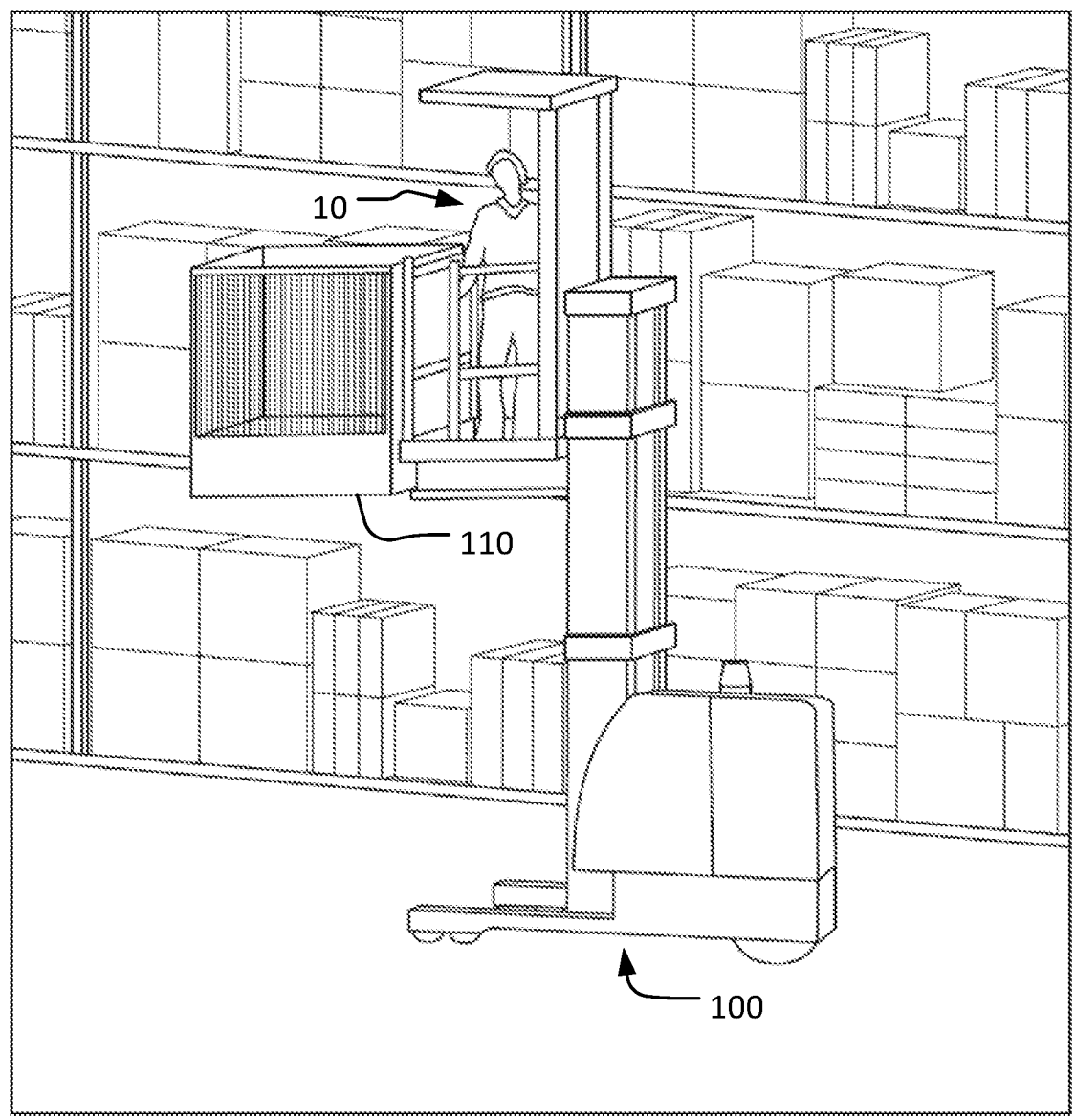
FIG. 1 illustrates a human worker who is operating an order picker to transfer items from storage racking into an order picker cage in example order picking scenario.

This document describes systems and methods for enhancing the efficiencies of order fulfillment and inventory stowage processes. For example, this document describes the use of mobile robots in conjunction with a human-operated high-bay order picker lift to pick and transport items for order fulfillment processes in an efficient manner. In particular, the systems and methods described herein can greatly reduce the amount of time that the human worker that is picking orders spends transporting the picked items. As described further below, mobile robots take over many of the tasks related to transporting the picked items. Accordingly, the efficiency of the human worker that is picking orders, as measured by the number of line items picked per hour for example, is greatly enhanced.

In some embodiments, this innovation is directed to order fulfillment systems and methods using autonomous or semi-autonomous mobile robots in conjunction with human-operated order picker lifts (e.g., high-bay order picker). The human picks goods/items from warehouse storage locations and places the goods in a cargo holder or receptacle (such as an order picker cage or pallet) that is engaged with the order picker lift being operated by the human. When the time comes to transport the receptacle that is holding the picked goods/items to a drop location (such as to an order sorting area, packaging area, shipping area, and the like), the receptacle is transferred from the order picker lift to the mobile robot. Then the mobile robot transports the receptacle holding the goods/items to one or more designated areas. During the time that the mobile robot is transporting the receptacle and goods/items, the human-operated order picker lift can quickly resume order picking. Accordingly, the human-operated order picker spends more time picking and less time transporting goods/items. The efficiency of the overall system is better than if the human-operated order picker has to transport the goods to the one or more designated areas for subsequent handling/processing.

In some embodiments, the mobile robots are programmed/controlled to "shadow" the human-operated order picker lift. In particular, in some embodiments a first empty mobile robot is always physically near to the human-operated order picker lift and ready to receive the receptacle holding the picked goods/items. In addition, a second mobile robot that is transporting an empty receptacle would always be near to the human-operated order picker lift, and ready to transfer the empty receptacle to the human-operated high-bay order picker lift. After transferring the empty receptacle, the second mobile robot can assume the duties of the first mobile robot, i.e., shadowing the human-operated order picker lift and awaiting to receive a receptacle holding picked saleable goods/items. This arrangement maximizes the percentage of time that the human-operated order picker lift spends actually picking saleable goods/items from warehouse storage locations. Hence, the systems described herein make efficient use of human labor.

Referring to FIG. 1, a human worker 10 is depicted as operating an order picker 100 in a warehouse to execute an order picking process. To execute such an order picking process, the worker 10 transfers one or more ordered items from the warehouse shelving or pallet rack to a cargo holder 110 that is engaged with the order picker 100. In this depicted example, the cargo holder is an order picker cage 110. In some embodiments, the order picker cage 110 includes casters so that the order picker cage 110 can be rolled around like a cart.

Typically, an order management system provides instructions to the worker 10 regarding what item(s) to pick, and the inventory locations from which to pick the item(s). The picked items may be for the fulfillment of an ecommerce order, store replenishment order, inventory transfer order, or any other type of order or inventory transfer instruction. The worker 10 generally picks one order at a time from storage, following a route up and down each aisle until the entire order is picked. The order picking instructions will typically list the items to be picked in the same sequence that the items are located along the picking flow path. During the picking process, the worker 10 will sometimes use a bar-code scanner to wand-in a bar code of the items to confirm those items have been picked and put into the order picker cage 110.

When all of the items of the order have been picked/transferred into the order picker cage 110, or when the order picker cage 110 is full, conventionally the worker 10 will then drive the order picker 100 to another area of the warehouse to drop off the order picker cage 110. Next, the worker 10 will drive the order picker 100 to pick up an empty order picker cage 110. Then, the worker 10 will drive the order picker 100 that is engaged with the empty order picker cage 110 back to the racking/shelving to begin the picking process for another order.

Based upon the teachings herein, one of skill in the art will readily understand that, in order to execute this conventional manual order picking process described above, the worker 10 spends an excessive amount of time traveling within the warehouse. That time spent traveling may be essentially unproductive time for the worker 10. As described in more detail below, some embodiments described herein provide a solution in which the worker 10 can spend a greater proportion of time actually picking items, rather than transporting the picked items and empty cargo holders. Moreover, operations with large numbers of orders will find that the congestion from many pickers working in the same areas slows down the processing.

Figure 2:
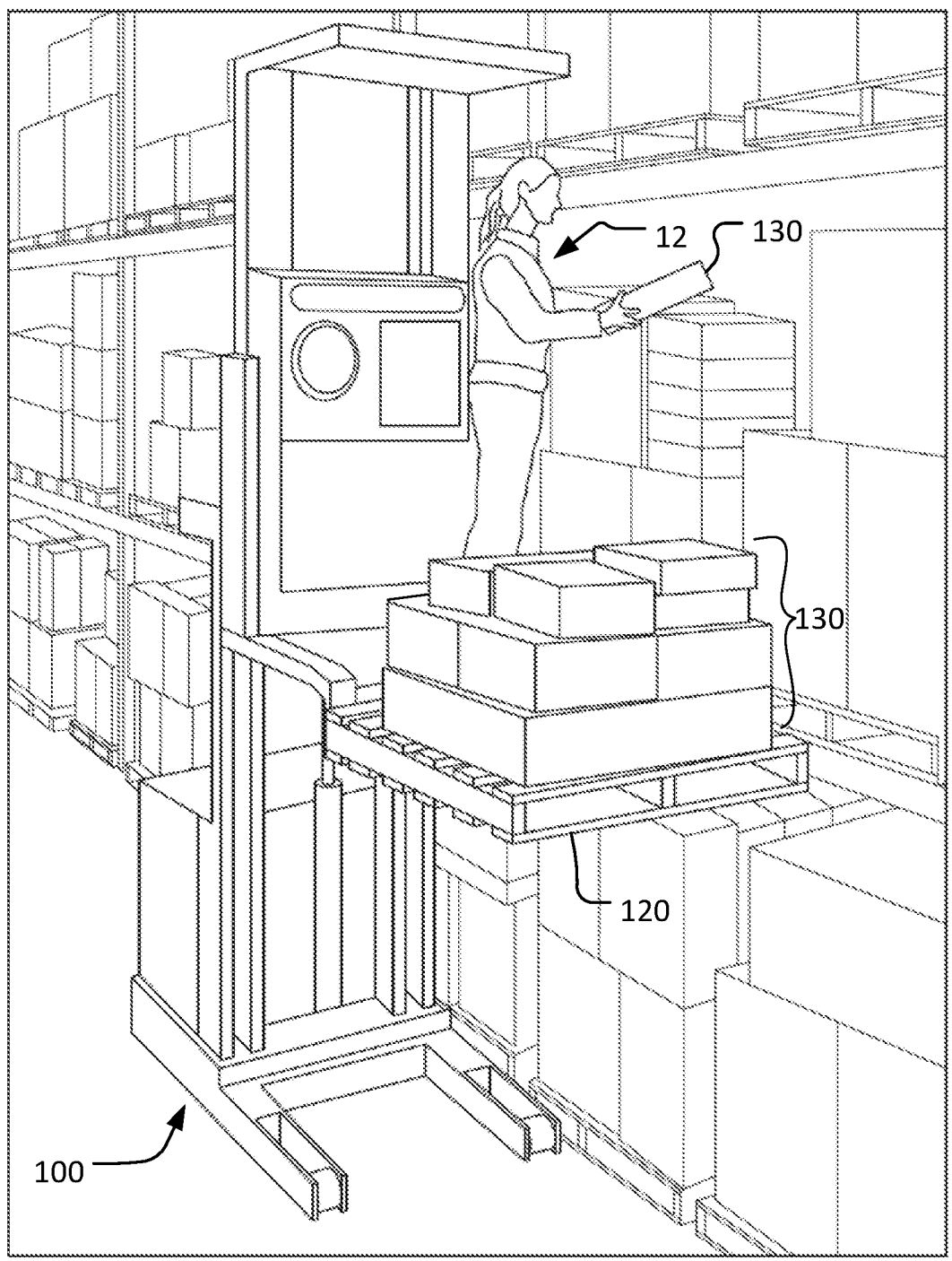
FIG. 2 illustrates a human worker who is operating an order picker to transfer items from a pallet that is engaged with the order picker into pallet storage racking in an example item stowing scenario.

Referring to FIG. 2, a human worker 12 is depicted as operating an order picker 100 in a warehouse to execute an inventory replenishment stowing process. To execute such an inventory replenishment stowing process, the worker 10 transfers one or more replenishment items 130 from a cargo holder 120 that is engaged with the order picker 100 to the warehouse shelving or pallet racks. In this depicted example, the cargo holder 120 is pallet 120. Such an inventory replenishment stowing process is essentially the reverse of an order picking process.

In a conventional inventory replenishment stowing process, when all of the items 130 from the cargo holder 120 have been transferred by the worker 12 to the shelving/racks, the worker 12 will then drive the order picker 100 with the empty cargo holder 120 to drop off the empty cargo holder 120 in a designated area of the warehouse. Next, the worker will drive the order picker 100 to pick up another cargo holder 120 that is carrying more items to be stowed in the shelving/racks. Then, the worker 10 will drive the order picker 100 that is engaged with the full cargo holder 120 back to a designated racking/shelving area to begin the stowing process for the items on/in the cargo holder 120.

Based upon the teachings herein, one of skill in the art will readily understand that, in order to execute the conventional inventory replenishment stowing process described above, the worker 10 may spend an excessive amount of time traveling within the warehouse, which is essentially unproductive time for the worker 10. As described in more detail below, some embodiments described herein provide a solution in which the worker 10 can spend a greater proportion of time actually stowing items in/on the shelving/racks, rather than transporting the empty and/or full cargo holders 120.

This document describes systems and methods for enhancing the efficiencies of order fulfillment and inventory stowage processes. For example, this document describes the use of mobile robots to greatly reduce the amount of time that the human worker that is picking orders or stowing inventory spends in transportation. As described further below, mobile robots take over many of the tasks related to transporting items. Accordingly, the efficiency of the human worker that is picking orders or stowing inventory, as measured by the number of line items picked/stowed per hour for example, is greatly enhanced.

Figure 3:
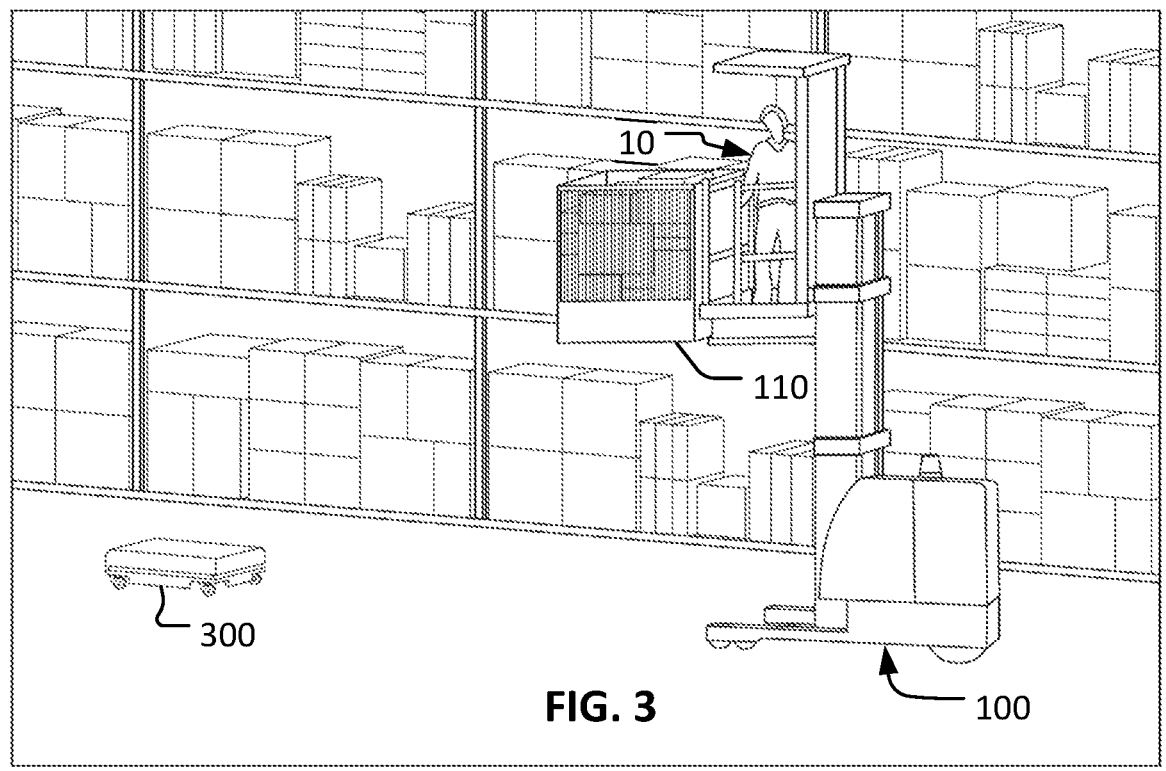
FIG. 3 illustrates the same scenario as FIG. 1 with the addition of a first mobile robot that is standing by, waiting to receive the filled order picker cage from the human-operated high-bay order picker.

FIG. 3 illustrates the same scenario as FIG. 1, but with the addition of a first mobile robot 300 that is standing by, waiting to receive the order picker cage 110 from the order picker 100 that is being operated by the human worker 10. The worker 10 will control the order picker 100 to transfer the order picker cage 110 to the first mobile robot 300 when appropriate (e.g., when all of the items for the order have been put into the order picker cage 110, when the order picker cage 110 is full, and so on).

When the order picker cage 110 is ready to be transported to one or more other areas in the warehouse, the order picker cage 110 will be transferred from the order picker 100 to the first mobile robot 300. Then, the first mobile robot 300 will automatically transport the order picker cage 110 to the one or more other areas in the warehouse. While the first mobile robot 300 is transporting the order picker cage 110, the worker 10 can go back to the job of picking items for the next order, for example. Accordingly, the worker 10 operating the order picker 100 will not be tied up as the order picker cage 110 is transported, and the productivity of the worker 10 (e.g., as measured in number of items picked per hour) will be significantly improved (as compared to if the worker 10 transported the order picker cage 110.

Figure 4:
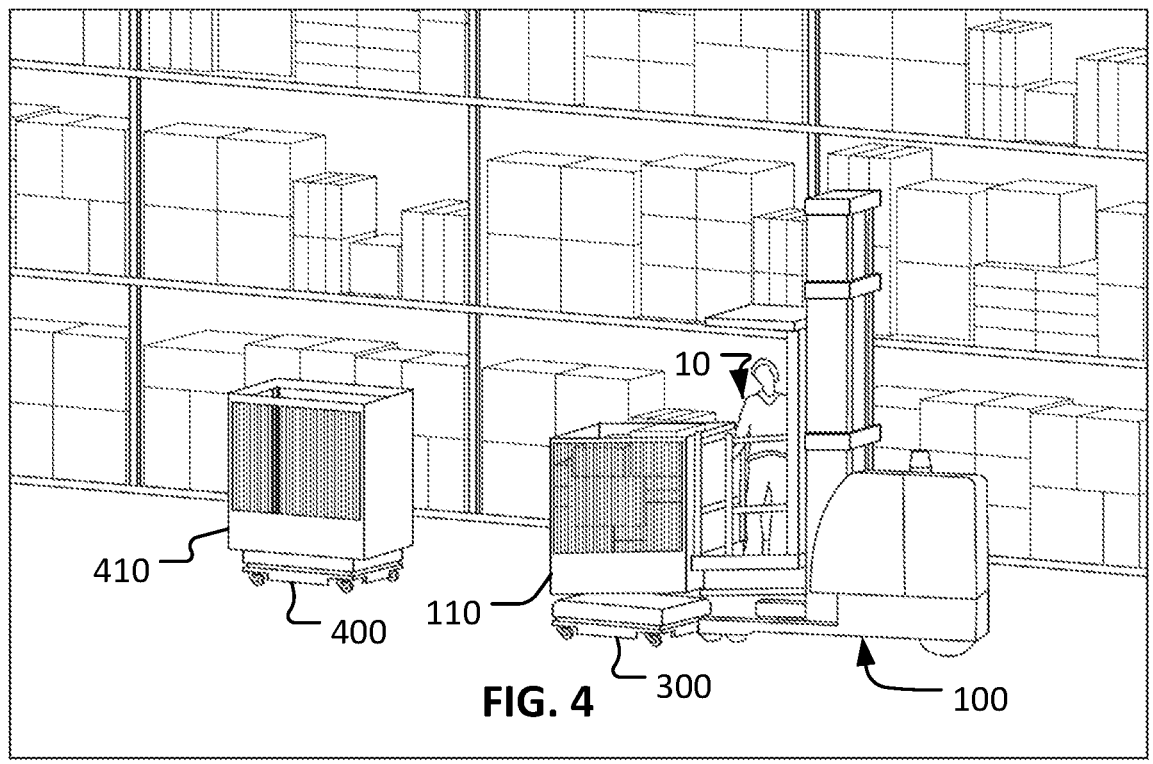
FIG. 4 illustrates the placement of the filled order picker cage from the human-operated high-bay order picker onto the first mobile robot, and also illustrates a second mobile robot that is carrying an empty order picker cage.

Referring to FIG. 4, when it is time to transfer the order picker cage 110 from the order picker 100 to the first mobile robot 300, in some embodiments the first mobile robot 300 will move into a cargo transfer position proximate to the order picker 100. Then, the worker 10 will place the order picker cage 110 onto the first mobile robot 300. Alternatively, in some embodiments the worker 10 will place the order picker cage 110 onto the floor, and then the first mobile robot 300 will move under the order picker cage 110 and lift the order picker cage 110. Once the order picker cage 110 has been transferred to the first mobile robot 300, then the first mobile robot 300 will begin to transport the order picker cage 110 to one or more other locations within the warehouse (e.g., shipping, packaging, sortation, attribute collection, another storage location, etc.).

Still referring to FIG. 4, in some embodiments a second mobile robot 400 that is transporting an empty order picker cage 410 can be standing by, waiting to transfer the order picker cage 410 to the order picker 100 that is being operated by the human worker 10. Accordingly, the human worker 10 operating the order picker 100 will not have to travel to get an empty order picker cage 410. In this way, the time that the worker 10 spends picking (transferring items from the storage rack/shelves to the cargo holder) is maximized because the worker 10 spends little to no time transporting the full and empty cargo holders (e.g., order picker cages 110 and 410).

Figure 5:
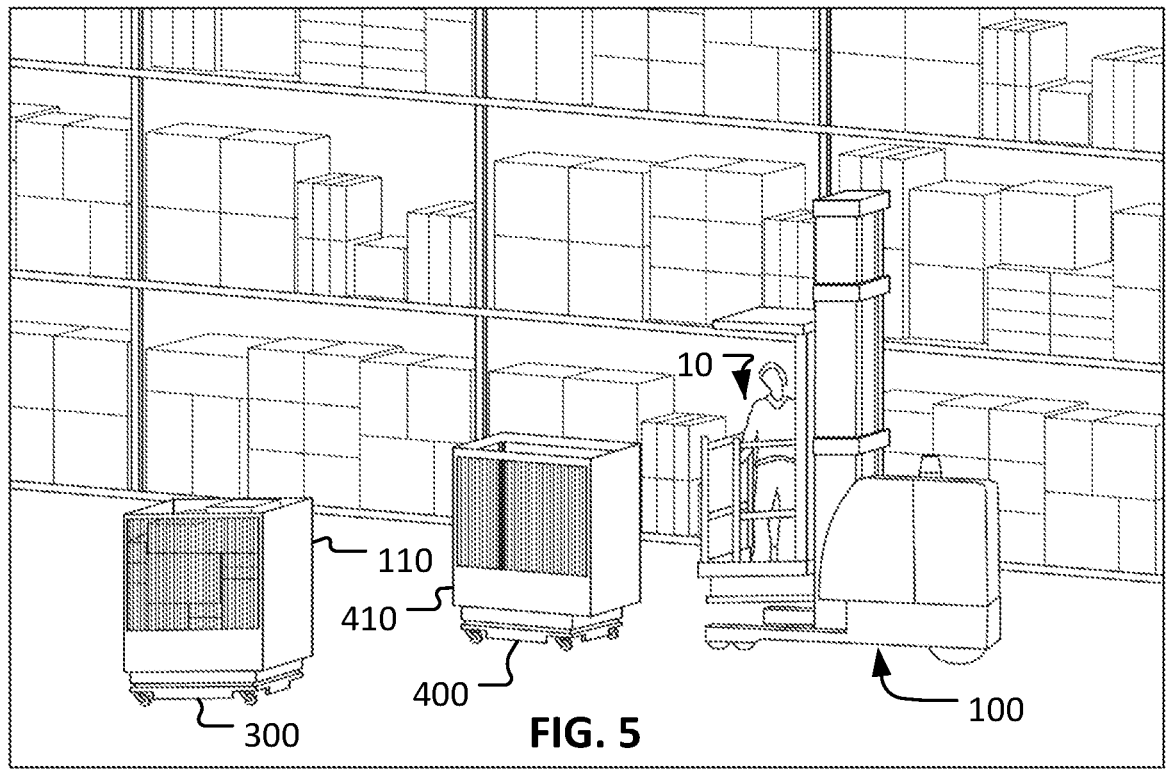
FIG. 5 illustrates the first mobile robot in the process of transporting the filled order picker cage, and also illustrates the second mobile robot moving into position to transfer the empty order picker cage to the high-bay order picker.

Referring to FIG. 5, once the order picker cage 110 has been transferred to the first mobile robot 300, the first mobile robot 300 will then begin to transport the order picker cage 110 to one or more other locations within the warehouse for further handling/processing. Once the first mobile robot 300 carrying the order picker cage 110 has moved away from the order picker 100, the second mobile robot 400 will move into the cargo transfer position proximate to the order picker 100. In some embodiments, the second mobile robot 400 will place the order picker cage 410 on the floor near to the order picker 100, and then move away from the order picker cage 410 so that the order picker 100 can move toward the order picker cage 410 and engage with the order picker cage 410. In some embodiments, the second mobile robot 400 carrying the order picker cage 410 will move close to the order picker 100, and then the worker 10 will operate the order picker 100 to engage with and lift the order picker cage 410 off from the second mobile robot 400. Then, the worker 10 will operate the order picker 100 (engaged with the order picker cage 410), and begin picking items again from storage and placing the items into the order picker cage 410.

Figure 6:
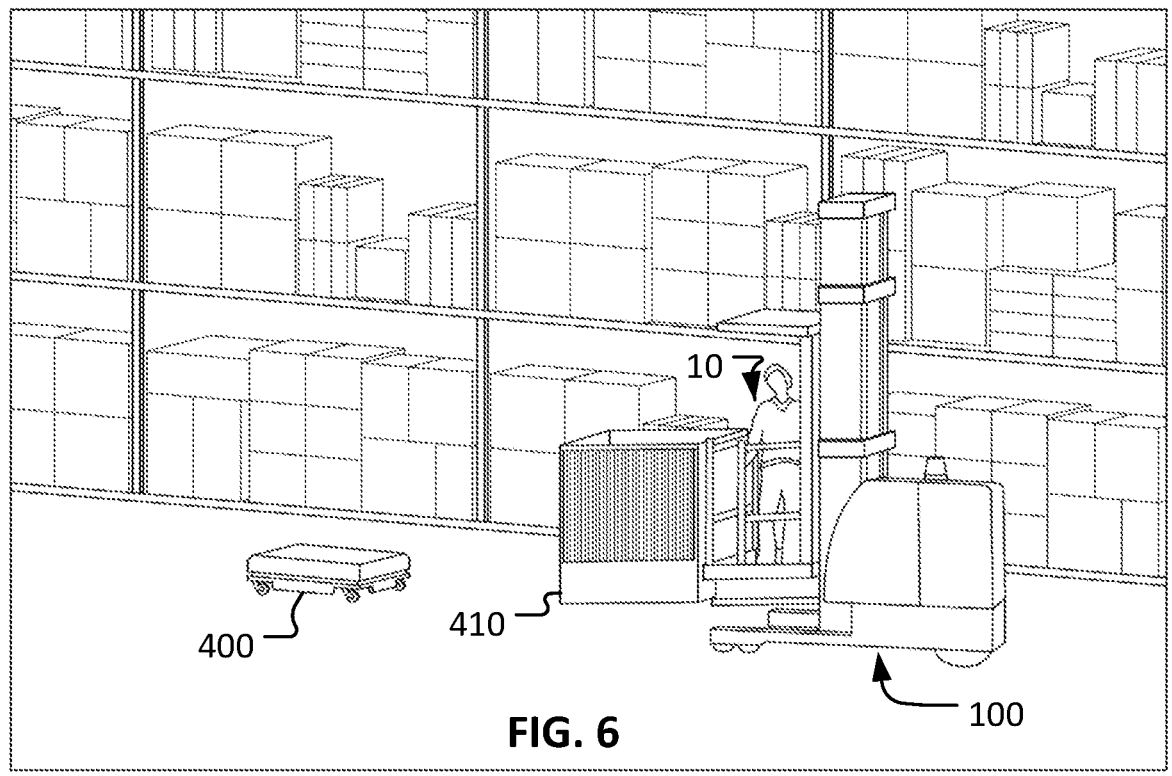
FIG. 6 illustrates the high-bay order picker with the empty order picker cage, and also illustrates the second mobile robot now waiting to receive the order picker cage from the human-operated high-bay order picker when the order picker cage has been filled.

Referring to FIG. 6, when the order picker cage 410 has been transferred from the second mobile robot 400 to the order picker 100, then the second mobile robot 400 can move a short distance away from the order picker 100 and stand by to receive the order picker cage 410 once the appropriate time comes (e.g., when the order picker cage 410 is full or an entire order has been picked). Said another way, after transferring the empty order picker cage 410 to the order picker 100, the second mobile robot 400 can take on the role that was previously played by the first mobile robot 300 in the context of FIG. 3 (waiting nearby to receive a cargo holder that is holding items that then need to be transported elsewhere).

While the second mobile robot 400 is waiting to receive the order picker cage 410, a third mobile robot (not shown) that is carrying another empty order picker cage can move near to the order picker 110. The third mobile robot carrying the empty order picker cage would take on the role that was previously played by the second mobile robot 400 in the context of FIG. 4. Accordingly, it should be understood that the process of always having at least two mobile robots near to the order picker 100 can be cyclical and ongoing (where one of the two mobile robots is ready to receive a cargo holder with items from the order picker 100, and the other mobile robot is carrying an empty cargo holder to be transferred to the order picker 100). In other words, mobile robots will be essentially constantly coming and going from the order picker 100, transporting cargo holders (empty cargo holders or cargo holders that include picked items). In this manner, the time spent by the worker 10 transporting cargo holders is minimized, and the time spent by the worker 10 picking items is maximized.

One or more computerized systems, such as a warehouse fleet manager system, can be used to automatically control the movements of the mobile robots as described above. For example, the mobile robots 300 and 400 and the order picker 100 can be in wireless communication with the fleet manager system such that the fleet manager system can detect the locations of the mobile robots 300 and 400 and the order picker 100, and send control commands to the mobile robots 300 and 400 to cause them move when and where as necessary to execute the processes described herein. In some embodiments, the mobile robots 300 and 400 can include vision systems and/or other types of sensors to facilitate the execution of the processes described herein.

In some cases, the mobile robots 300 and 400 are controlled by the fleet manager system to shadow the movements of the order picker 100. That is, the mobile robots 300 and 400 can be controlled to automatically move in response to movements of the order picker 100. In that way, the mobile robots 300 and 400 can stay in relatively close proximity to the order picker 100 at all times (e.g., in a master-slave relationship) while waiting for direct interactions with the order picker 100. Alternatively, in some embodiments the mobile robots 300 and/or 400 can be staged in a designated area (such as at an end of a warehouse aisle) while waiting for direct interactions with the order picker 100.

An order management system, which can provide a pick list of items that the worker 10 needs to put into/on the cargo holder for an order, can also be in communication with the fleet manager system. When the order management system has detected that the worker 10 has picked all of the necessary items (e.g., in response to inventory transactions made by the worker 10 in the order management system), the order management system can provide a signal to the fleet manager system to send a standing-by empty mobile robot to pick up the cargo holder that includes the necessary items. Alternatively or additionally, in some cases the worker 10 can enter a command that triggers the fleet manager system to send the standing-by empty mobile robot to pick up the cargo holder that includes the necessary items. The order management system can also communicate to the fleet manager system the location(s) to which the mobile robot should transport the cargo holder that includes the necessary items.

Additional Optional Features and Embodiments

In one variation of the above-described process, the human-operated order picker lift can pick up a mobile robot that is transporting an empty cargo holder. In other words, the order picker can engage with and lift/transport not only the cargo holder but also the mobile robot transporting the cargo holder. Then, when the time comes for the cargo holder to go to the next location (e.g., after it is sufficiently filled with picked items), the human-operated order picker lift can simply set down the mobile robot and cargo holder on the floor, and the mobile robot will transport the cargo holder to the appropriate location(s). After setting down the mobile robot and cargo holder, the human-operated order picker lift can engage and lift/transport another nearby mobile robot carrying an empty cargo holder (which was shadowing the human-operated order picker) and continue picking orders.

While an order picking process that includes the use of mobile robots for transporting cargo holders has been described above, it should be understood that analogous principles can be used to execute an improved inventory replenishment stowing process (e.g., as represented in FIG. 2). For example, a first mobile robot transporting a cargo holder containing replenishment items can automatically move to the order picker 100 in the warehouse aisle. The cargo holder containing replenishment items can be transferred into engagement with the order picker 100, and the worker 12 can then transfer the items from the cargo holder (e.g., the pallet 120) to the appropriate rack/shelf storage locations. When the transferring is complete, the worker 12 can operate the order picker 100 to transfer the now empty cargo holder to the same mobile robot from which it was received. Then, another mobile robot that is transporting another cargo holder containing replenishment items can automatically move to the order picker 100 so that the cargo holder can be engaged with the order picker 100. This process can be cyclically repeated, with the mobile robots taking over most of the tasks related to transporting items. Accordingly, the efficiency of the human worker 12 that is stowing items into inventory, as measured by the number of line items stowed per hour for example, is greatly enhanced.

In yet another variation of the processes described above, order picking and inventory stowage can be combined into a highly efficient continuous-flow process as follows. First, order picking can take place as depicted in FIGS. 3-5 (e.g., the worker 10 can place ordered items from the storage racks/shelves into the order picker cage 110). However (in reference to FIGS. 4-6), after the order picker 100 has transferred the sufficiently-filled order picker cage 110 back to the first mobile robot 300, the order picker cage 410 transported to the order picker 100 by the second mobile robot 400 can include one or more items to be stowed into inventory (rather than being empty). The worker 10 can then stow the items from the order picker cage 410 into the proper storage locations. When that stowing process has been completed such that the order picker cage 410 is empty but still engaged with the order picker 100, then the worker 10 can begin another order picking process. That is, the worker 10 can then begin to place ordered items from the storage racks/shelves into the emptied order picker cage 410. After the order picker 100 has transferred the sufficiently-filled order picker cage 410 back to the second mobile robot 400, another order picker cage that is carrying one or more items to be stowed into inventory (rather than being empty) can be transported to the order picker 100 by a mobile robot. This combined process of picking, stowing, picking, stowing, and so on, can be cyclically repeated as however desired, and very little unproductive time by the worker 10 will be incurred. It should be also understood that in some cases the sequence of picking and stowing can be adjusted to optimally suit the needs of the warehouse operation at that time. For example, an optimized combined process may sequentially be: picking, stowing, stowing, picking, picking, stowing, picking and whatever process (picking or stowing) makes the most sense next based on the real-time ongoing dynamic needs of the operation.

In yet another variation of the processes described above, a cargo holder that is used for receiving ordered items can remain at floor level while the worker operating the order picker is picking items from higher elevations of the racks/shelves. In that arrangement, the items picked by the worker can be lowered (e.g., one at a time) to the floor level where the items are received by the awaiting cargo holder (e.g., cage, tote, pallet, etc.). When the cargo holder receiving the ordered items is sufficiently filled, a mobile robot can then transport the cargo holder and items to the next appropriate warehouse location, and another empty cargo holder can take its place at floor level waiting to receive picked ordered items. Using this arrangement, the worker will not need to spend time traveling vertically (using the order picker) to drop off and pick up cargo holders. Instead, the worker can just keep on picking. In some embodiments, the mobile robots can take the picked items to an order sortation process after the picking. This arrangement uses a vertical transport for transferring the items between the worker and the floor level cargo carrier. The vertical transport could be various types of mechanisms (e.g., an elevator, vertical conveyor, telescoping arm, chute, slide, etc.) that is attached to the order picker. In some embodiments, a mobile robot with a cargo holder can vertically ascend up to the elevated position of the worker on the order picker, and then descend back to the floor level for transport when the cargo holder has been sufficiently filled with order items.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse, a trackball, or a touchscreen, etc.) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, tactile input, eye movement tracking input, a brain-computer interface, gesture input, and the like, and combinations thereof).

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described herein as acting in certain combinations and even initially claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described herein should not be understood as requiring such separation in all embodiments, and it should be understood that the described program components and systems can generally be integrated together in a single product or packaged into multiple products.

What is claimed is:

1. An order picking system, comprising:
    an order picker configured to transport a cargo holder configured for receiving items picked from storage;
    a first mobile robot configured to transport the cargo holder;
    a second mobile robot configured to transport the cargo holder; and
    a warehouse fleet manager system in wireless communication with each of the order picker and the first and second mobile robots, the warehouse fleet manager system configured to:
        control the first mobile robot to move in correspondence with movements of the order picker;
        control the second mobile robot to move in correspondence with the movements of the order picker;
        control the first mobile robot to move into a first cargo holder transfer position proximate to the order picker to receive a first cargo holder from the order picker;
        control the first mobile robot to transport the first cargo holder received from the order picker to one or more remote locations; and
        control the second mobile robot to move into a second cargo holder transfer position such that a second cargo holder can be transferred to the order picker.

2. The system of claim 1, wherein the first and second cargo holders are each cages.

3. The system of claim 2, wherein the order picker lowers the first cargo holder onto a floor and then the first mobile robot moves under the first cargo holder to receive it.

4. The system of claim 2, wherein the order picker lowers the first cargo holder onto the first mobile robot and the first mobile robot receives it.

5. The system of claim 1, wherein the cargo holders are each pallets.

6. The system of claim 5, wherein the order picker lowers the first cargo holder onto the first mobile robot and the first mobile robot receives it.

7. The system of claim 1, wherein the first and second cargo holder transfer positions are a same position.

8. The system of claim 1, wherein the first and second cargo holder transfer positions are differing positions.

9. A method of order picking, the method comprising:
    controlling a first mobile robot to move in correspondence with movements of an order picker that is transporting a first cargo holder configured for receiving items being picked from storage, the first mobile robot being configured to receive the cargo holder from the order picker;
    controlling a second mobile robot to move in correspondence with the movements of the order picker, wherein the second mobile robot is transporting a second cargo holder;
    controlling the first mobile robot to move into a cargo holder transfer position proximate to the order picker to receive the first cargo holder from the order picker;
    controlling the first mobile robot to transport the first cargo holder received from the order picker to one or more remote locations; and
    controlling the second mobile robot to move into the cargo holder transfer position such that the second cargo holder can be transferred to the order picker.

10. The method of claim 9, wherein each of the controlling steps is performed by a warehouse fleet manager system.

11. The method of claim 10, wherein the warehouse fleet manager system is in wireless communication with each of the order picker and the first and second mobile robots.

12. The method of claim 9, wherein the first and second mobile robots are controlled to shadow the movements of the order picker.

13. The method of claim 9, further comprising controlling a third mobile robot to move into proximity of the second mobile robot, wherein the third mobile robot is transporting a third cargo holder.

14. The method of claim 9, further comprising controlling the second mobile robot to transport the second cargo holder received from the order picker to one or more remote locations.

15. A method of picking ordered items and stowing replenishment items, the method comprising:
    a) transferring, by a worker operating an order picker, one or more first ordered items from first storage locations and putting the one or more first ordered items in or on a first cargo holder that is engaged with the order picker;
    b) transferring, from the order picker to a first mobile robot, the first cargo holder with the one or more first ordered items in or on it;
    c) after the transferring of the first cargo holder with the one or more first ordered items in or on it to the first mobile robot, transferring, from a second mobile robot, a second cargo holder with one or more replenishment items in or on it such that the second cargo holder with the one or more replenishment items in or on it becomes engaged with the order picker;

d) transferring, by the worker operating the order picker, the one or more replenishment items from the second cargo holder that is engaged with the order picker into storage locations; and e) after the transferring of the one or more replenishment items into the storage locations, transferring, by the worker operating the order picker, one or more second ordered items from second storage locations and putting the one or more second ordered items in or on the second cargo holder that is engaged with the order picker.

16. The method of claim 15, further comprising:

f) transferring, from the order picker to the second mobile robot, the second cargo holder with the one or more second ordered items in or on it.

17. The method of claim 16, wherein, after the second cargo holder with the one or more second ordered items in or on it is transferred to the second mobile robot, the second mobile robot transports the second cargo holder with the one or more second ordered items in or on it to one or more remote locations.

18. The method of claim 15, wherein, after the first cargo holder with the one or more first ordered items in or on it is transferred to the first mobile robot, the first mobile robot transports the first cargo holder with the one or more first ordered items in or on it to one or more remote locations.

19. The method of claim 15, wherein the first and second cargo holders are each cages.

20. The method of claim 15, wherein the cargo holders are each pallets.

* * * * *